(12) United States Patent
Bokelaar

(10) Patent No.: US 10,206,380 B1
(45) Date of Patent: Feb. 19, 2019

(54) MECHANICAL FISH TRAP

(71) Applicant: Willy G. Bokelaar, Chesapeake, VA (US)

(72) Inventor: Willy G. Bokelaar, Chesapeake, VA (US)

( * ) Notice: Subject to any disclaimer, the term of this patent is extended or adjusted under 35 U.S.C. 154(b) by 90 days.

(21) Appl. No.: 14/629,620

(22) Filed: Feb. 24, 2015

Related U.S. Application Data

(60) Provisional application No. 61/943,552, filed on Feb. 24, 2014.

(51) Int. Cl.
| | |
|---|---|
| *A01K 69/06* | (2006.01) |
| *A01K 69/00* | (2006.01) |
| *A01K 69/04* | (2006.01) |
| *A01K 79/00* | (2006.01) |
| *E02B 1/00* | (2006.01) |
| *E02B 8/08* | (2006.01) |

(52) U.S. Cl.
CPC ............. *A01K 69/06* (2013.01); *A01K 69/00* (2013.01); *A01K 69/04* (2013.01); *A01K 79/00* (2013.01); *E02B 1/006* (2013.01); *E02B 8/085* (2013.01)

(58) Field of Classification Search
CPC ........ A01K 69/00; A01K 69/04; A01K 69/06; A01K 69/08; A01K 74/00; A01K 79/00; E02B 1/006; E02B 8/085
USPC ................... 43/100, 6.5, 101; 119/219, 220
See application file for complete search history.

(56) References Cited

U.S. PATENT DOCUMENTS

| | | | | |
|---|---|---|---|---|
| 693,391 | A * | 2/1902 | Holland | A01K 69/06 43/100 |
| 1,388,414 | A * | 8/1921 | Dros | A01K 79/00 43/17.1 |
| 1,415,113 | A * | 5/1922 | Phillips, Jr. | A01K 80/00 37/315 |
| 1,722,596 | A * | 7/1929 | Ross | E02B 8/085 405/78 |
| 1,745,251 | A * | 1/1930 | Enright | A01K 74/00 43/6.5 |
| 2,663,117 | A * | 12/1953 | Ederer | A01K 69/06 43/100 |
| 3,273,276 | A * | 9/1966 | Englesson | A01K 63/02 43/14 |

(Continued)

FOREIGN PATENT DOCUMENTS

| | | | | |
|---|---|---|---|---|
| DE | 3446540 A1 | * | 6/1986 | ............ A01K 69/08 |
| GB | 976520 A | * | 11/1964 | ............ A01K 79/00 |

(Continued)

OTHER PUBLICATIONS

Article; Appendix 16, A Low Head Elver Trap Developed for Use in Irish River; D.P. O'Leary; 5 pages.

*Primary Examiner* — Darren W Ark
(74) *Attorney, Agent, or Firm* — Karceski IP Law, PLLC

(57) ABSTRACT

A mechanical fish trap system is adapted to be installed in native water environments. The trap chamber is positioned in a first native water environment. The chamber includes a trap gate to allow a fish to swim into the trap chamber and then retain it therein. A water pipe is connected to the trap chamber. A water pump then pumps water through the water pipe and into the trap chamber and out the trap gate. The water pipe inlet is positioned in a second native water environment that is imbalanced with the water in the first native water environment.

15 Claims, 4 Drawing Sheets

(56) References Cited

U.S. PATENT DOCUMENTS

| | | | | |
|---|---|---|---|---|
| 3,552,054 A * | 1/1971 | Hansen | | A01K 79/00 43/6.5 |
| 3,596,394 A * | 8/1971 | Reeder | | A01K 97/05 43/55 |
| 3,638,346 A * | 2/1972 | Stein | | A01K 74/00 43/102 |
| 3,754,348 A * | 8/1973 | Ramsey | | A01K 69/08 43/103 |
| 3,772,891 A * | 11/1973 | Raistakka | | E02B 8/085 119/219 |
| 3,783,535 A * | 1/1974 | Hanks | | E02F 3/88 37/316 |
| 4,117,726 A * | 10/1978 | McGroddy | | G01N 1/10 43/6.5 |
| 4,175,347 A * | 11/1979 | Puretic | | A01K 73/12 43/6.5 |
| 4,437,431 A * | 3/1984 | Koch | | E02B 8/085 119/219 |
| 4,452,005 A * | 6/1984 | Poirot | | A01K 69/06 43/100 |
| 4,718,192 A * | 1/1988 | Louk | | A01K 69/00 43/100 |
| 4,831,773 A * | 5/1989 | Rostrom | | A01K 80/00 43/100 |
| 4,922,468 A * | 5/1990 | Menezes | | A01K 79/00 116/22 A |
| 5,142,808 A * | 9/1992 | Dupree, Jr. | | A01K 69/06 119/213 |
| 5,161,913 A * | 11/1992 | Boylan | | E02B 8/085 405/81 |
| 5,343,442 A * | 8/1994 | Vielberth | | A01K 69/06 367/139 |
| 5,433,554 A * | 7/1995 | Minakami | | E02B 8/085 119/219 |
| 5,899,017 A * | 5/1999 | Chen | | A01K 69/06 43/100 |
| 6,112,699 A * | 9/2000 | Saxby | | A01K 79/00 119/213 |
| 6,273,639 B1 * | 8/2001 | Eikrem | | E02B 8/085 405/83 |
| 6,325,570 B1 * | 12/2001 | Pohjamo | | E02B 8/085 119/219 |
| 6,343,433 B1 * | 2/2002 | Granberg | | A01K 79/00 114/255 |
| 6,394,699 B1 * | 5/2002 | Neufeld | | E02B 8/085 405/81 |
| 6,682,651 B1 * | 1/2004 | Toland | | B01D 29/15 405/127 |
| 6,726,404 B2 * | 4/2004 | Nestler | | E02B 1/006 119/219 |
| 8,252,175 B2 * | 8/2012 | Weir | | A01K 63/045 210/151 |
| 8,262,317 B1 * | 9/2012 | Jensen | | E02B 8/085 119/219 |
| 9,068,311 B2 * | 6/2015 | Greif | | E02B 8/085 |
| 9,834,899 B2 * | 12/2017 | Monai | | E02B 8/085 |
| 2001/0029694 A1 * | 10/2001 | Bodden | | A01K 61/006 43/102 |
| 2006/0048436 A1 * | 3/2006 | Ernsten | | A01K 79/00 43/6.5 |
| 2006/0090708 A1 * | 5/2006 | Patrick | | E02B 3/10 119/219 |
| 2006/0096547 A1 * | 5/2006 | Massey | | A01K 61/001 119/219 |
| 2012/0228202 A1 * | 9/2012 | Bailey | | B01D 29/05 210/155 |
| 2014/0174371 A1 * | 6/2014 | Ulriksen | | A01K 61/00 119/219 |
| 2017/0325432 A1 * | 11/2017 | Halse | | B65G 53/30 |

FOREIGN PATENT DOCUMENTS

| | | | | |
|---|---|---|---|---|
| GB | 1225469 A | * | 3/1971 | A01K 79/00 |
| GB | 2332848 A | * | 7/1999 | A01K 79/00 |
| JP | 60015365 A | * | 1/1985 | B65H 75/4402 |
| JP | 02238838 A | * | 9/1990 | |
| JP | 03058728 A | * | 3/1991 | |
| JP | 05095747 A | * | 4/1993 | |
| JP | 2004033104 A | * | 2/2004 | |
| JP | 2005278486 A | * | 10/2005 | |
| JP | 2008142027 A | * | 6/2008 | |
| JP | 2012228213 A | * | 11/2012 | |
| KR | 100846193 B1 | * | 7/2008 | |
| WO | WO 02078436 A1 | * | 10/2002 | A01K 79/00 |
| WO | WO 2008156370 A1 | * | 12/2008 | A01K 79/00 |
| WO | WO 2016065474 A1 | * | 5/2016 | B65G 53/30 |

* cited by examiner

MECHANICAL FISH TRAP

This application claims the benefit of filing of U.S. Provisional Patent Application Ser. No. 61/943,552 filed Feb. 24, 2014, which is incorporated by reference herein in its entirety.

The invention is directed to a fish trap deployed in a first native water environment that has water pumped through it. The water may be pumped from a second native water environment that is imbalanced as compared with the first native water environment at the location of the fish trap. The imbalance in the water properties may also be primed with a bait additive. It is the water imbalance that draws fish into the trap.

BACKGROUND

It is known that certain species of fish can and do migrate back and forth between fresh and saltwater environments as a part of their normal lifecycle. This can happen, for instance, during spawning. Common examples include salmon and eels among others. Other fish simply seasonally migrate from saltwater to brackish (less salty) water environments. Common examples of these fish include shad and rockfish. Still other fish may simply migrate in fresh water in upstream and downstream directions, all in fresh water, depending on their biological lifecycle. These fish include Asian carp.

A widely used method to capture fish includes indiscriminate netting and longline fishing. These fishing methods can result in wasteful bycatch—the catching of fish that are of no commercial importance to that particular fisherman.

Man-made structures such as dams can reduce or prevent the normal migration of fish between various bodies of water including saltwater and freshwater environments. Known solutions to overcoming these physical barriers like dams include fish ramps and efforts that provide a pathway for migrating fish around the man-made structure.

Migrating fish such as eels, and other fish generally, may have high sensitivity to water conditions. These fish can apparently detect subtle changes in, for instance, water salinity, oxygen, temperature, nutrition and rate of current flow. Depending on the age of the eel and the season, eels detect changes in water to move up into freshwater environments, or alternatively, downstream to brackish and ocean water environments. Eels innately swim in appropriate directions upstream and downstream according to their age and the season.

SUMMARY

Accordingly, it is an object of the present invention to trap migrating fish that ordinarily and naturally move upstream and downstream between fresh or brackish water and ocean saltwater. By pumping water from a first native water environment to a second native water environment where the water conditions are different from the first native water environment, a small water imbalance is created inside and proximate a trap in order to draw the migrating fish instinctively toward the water imbalance and into the trap structure. This trap is effective, both pumping relatively fresh water into a salt or brackish water environment where a trap is located, and alternatively, pumping salt or brackish water to a relatively freshwater location where a trap may be located.

Additionally, it is an object of the present invention to trap fish that may be attracted to changes in water conditions generally including priming water with bait that is pumped through a trap.

In one example, a mechanical fish trap system is adapted to be installed in a native water environment. The fish trap system includes a trap chamber having an inlet and a trap gate. The fish trap system further includes a water pipe having a trap end and an intake end, that trap end connected to the inlet of the trap chamber. A water pump is mounted in line with the water pipe and is adapted to pump water from the intake end of the pipe to the trap end of the pipe and into and through the trap chamber. A screen is mounted to the inside of the trap chamber and proximate the inlet, the screen adapted to allow water flow through it and into the inside of the trap chamber but to block a fish from passing through it. The trap gate is adapted to allow water to flow through it and outside of the trap chamber into a first native water environment, but the trap gate also allows a fish to swim into the trap chamber and then be retained therein. The water pipe intake end is placed in a second native water environment. The water in the second native water environment is imbalanced with the water in the first native water environment. The water imbalance between the first and second native water environments is selected from the group consisting of salinity, oxygen, nutrition, temperature, and water current speed and direction. The trap system may further include a lead net attached at one end to the trap chamber and proximate, but not covering the trap gate, wherein the lead net extends outwardly from the trap chamber to guide fish to the trap chamber. The system may further include a second lead net attached at one end to the trap chamber and extending outwardly from the trap chamber to guide fish to the trap chamber. Additionally, the trap system may further include a camera mounted onto the trap chamber and monitoring the inside of the trap chamber to enable remote viewing of the harvest of fish inside the trap chamber.

DETAILED DESCRIPTION

Figure 1:
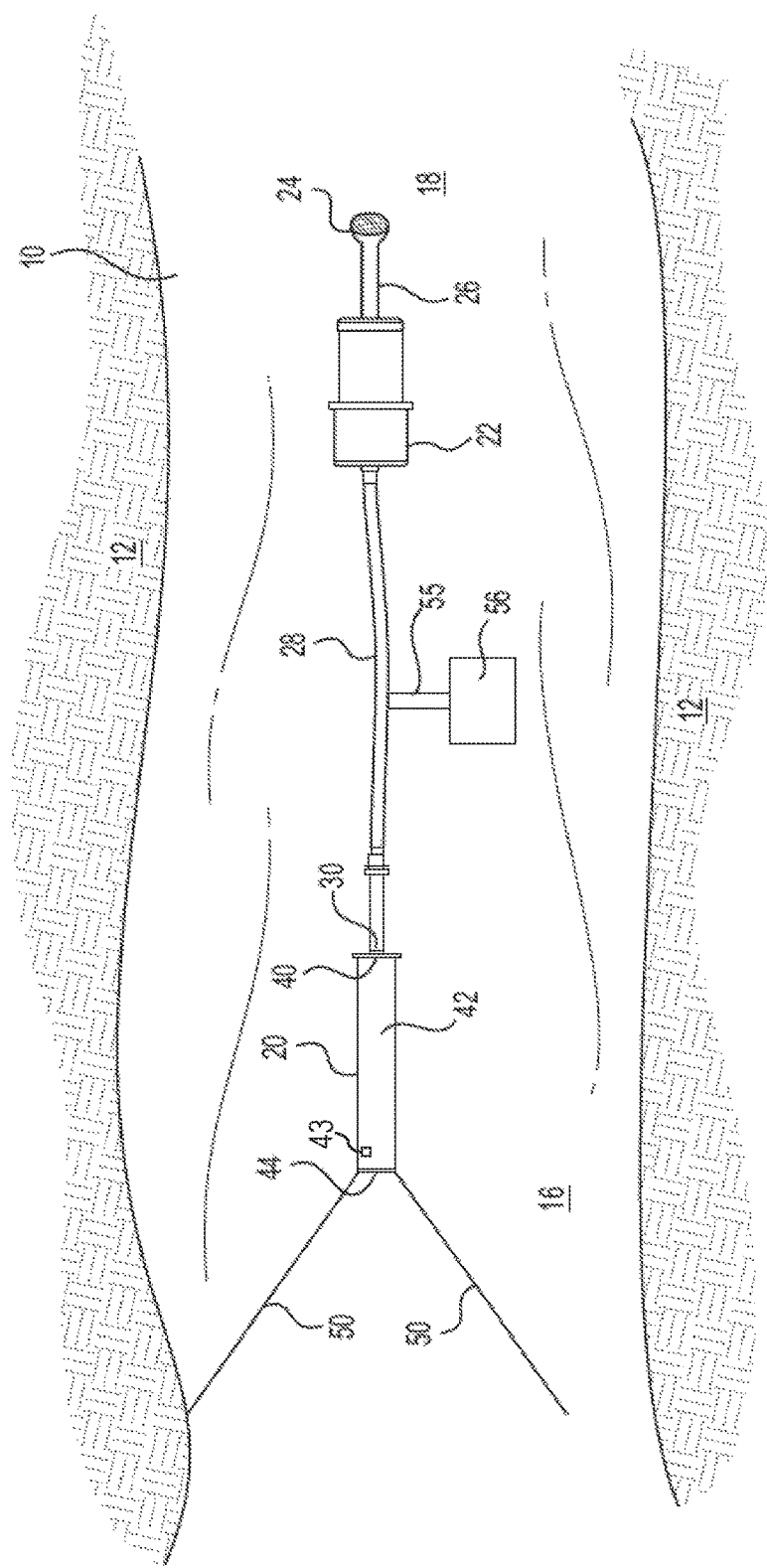
FIG. 1 is a schematic of a mechanical fish trap system as described herein.

As will be explained, the mechanical fish trap system described herein is directed to the attraction and capture of migrating fish that have a substantial sensitivity to water conditions and characteristics. These fish are able to detect minor water imbalances and use that ability as part of their biological compass to aid their migration and movement in and between fresh water, brackish water and ocean salt water, in either direction.

The system includes a trap chamber. The chamber may be any box or tube or container of any shape that has mostly solid walls on its sides. An inlet is an aperture on one side or end of the trap chamber. An outlet is provided on another wall or wall portion of the trap chamber. The outlet has a trap gate mounted across it. The walls of the trap chamber are mostly solid between the inlet and the outlet to create and allow a flow of water through the trap chamber. The trap chamber may be any size, for instance one to fifty gallons up to hundreds or thousands of gallons, or alternatively five to twenty gallons. Since the trap chamber is adapted to capture migrating fish, the chamber must also be fabricated of a material that is resilient and durable with respect to keeping predators outside of the chamber from stealing fish from inside the chamber.

A screen is mounted inside the trap chamber and over the inlet aperture or otherwise across the entire chamber cross-section inside the trap. This screen is adapted to block fish from following the water flow into and down the water pipe. Alternatively, the screen is porous enough to allow relatively free flow of the water from a water pipe into the trap chamber.

A water pipe is connected on one end to the trap chamber. The water pipe runs into or inside at least a portion of the trap chamber. The water pipe can be a rigid tube or flexible hose or, more likely a combination thereof. The water pipe can be approximately one half to twelve inches in diameter. Or alternatively, the water pipe can be about one to six inches in diameter. On the trap end, the water pipe is clamped to and around an aperture inlet into the trap chamber. The water pipe may extend into the chamber, in one alternative most of the way to a trap gate at an outlet side of the trap chamber. The intake end of the water pipe is positioned in a second native water environment that is imbalanced with the first native water environment of the trap chamber location. For example, the intake end of the water pipe may be positioned approximately several hundred yards upstream or downstream of a trap location, for instance, near a fall line in a river or moving body of water. In another example, the intake end of the water pipe may be on the opposite side of a dam from a trap chamber location. In a still further example, the intake end of a water pipe may be in a relatively fresh water river with the trap chamber connected on the other end of the water pipe in an ocean or bay. The length of the water pipe can be from several yards to miles in length.

A pump is installed in line with the water pipe. The pump moves water from the intake end to the trap end of the water pipe. Depending on the distance that the water is being moved, there may be multiple pumps positioned along the length of the water pipe. The pump rate is variable. For instance, if the trap chamber is placed in a native water environment that happens to be a large and/or fast-moving body of water, then a relatively high volume of water from a second native water environment may be pumped through the trap chamber. There should be enough of this water to get the sensory attention of a migrating fish, but not so much as to significantly alter the native water environment.

The intake end of the water pipe and the trap chamber are positioned in first and second native water environments. These native water environments can be characterized and objectively measured by at least several factors. These factors may include salinity, temperature, oxygen, nutrition and water current speed and direction. Some migrating fish such as eels are very sensitive to some or many water factors. Specifically, eels can detect water imbalance, especially as it relates to their migration. For example, eels are able to detect differences between fresh/brackish/salt waters. The biological compass of these fish will direct their migration in the proper direction.

The present system may include first and second native water environments. One native water environment is located at the trap chamber. This location may be anywhere that fish travel that includes fish that are desirable for capture. This water environment may include fresh, salt or brackish water. The second native water environment is different from the first native water environment and is a location of a water pipe intake. Importantly, there is a water imbalance between the first and second native water environments. This imbalance is for example, indicative of water characteristics in the direction of a particular fish biological compass. If a fish is moving from a fresh water river toward an ocean, then the second water environment is at least some amount more saline than the first water environment where the trap chamber is positioned. Conversely, if a fish is moving from an ocean salt water environment toward fresh water rivers and streams, then the second native water environment where the intake end of a water pipe is positioned is more fresh than the trap chamber location and corresponding native water environment.

An alternative to variable water chemistry to attract and capture fish is water flow rate and direction of flow. By deploying a high pressure pump creating a relatively high flow rate, a fish can sense that flow and be attracted to a trap chamber while believing that they are going "upstream" as is their biological desire. In this way, the water flow and direction alone can be a fish attraction.

Another alternative to modify water conditions and chemistry is to prime the water that is being pumped into and through a trap chamber. A bait reservoir or feeder box is connected by a hose or pipe to the water pipe that supplies water to the trap chamber. An appropriate bait material such as fish oil or animal blood may be fed into the water flow in the water pipe. The bait is then pumped into the trap chamber and into the proximate first native water environment to attract fish to the trap. The type of bait can be selected to attract a specific fish species. The amount of bait used can also be varied depending on the known senses of a given fish. Finally, this bait system may be deployed both separate from and combined with water sourced from a second native water environment. In other words, the addition of bait to the water flow through a trap may be used alone (NO second native water) or in combination with other water imbalances in water taken from a second native water environment source.

A lead net may be attached to the trap chamber and proximate the trap gate. The lead net may extend outwardly from the chamber and provide a physical guide to direct fish toward the trap gate and trap chamber. The lead net may extend out a single side of the trap chamber or, alternatively, both sides in a outwardly diverging direction in order to help corral the fish and move them toward the trap chamber.

Turning now to FIG. 1, a trap system is illustrated as being positioned in a river. Specifically, a river 10 flows between banks 12. A fish trap 20 is positioned in a first native water environment 16 that is proximate that trap. The trap 20 is connected by a water pipe 28 to a pump 22 and an intake end 24 of the water pipe. A segment 26 of the water pipe connects the intake end 24 to the pump 22. The intake end 24 is positioned in a second native water environment 18. The water pipe 28 has trap end 30 that is connected to an inlet 40. The pump 22 is able to draw water through the intake end 24 in water pipe 28 and into the trap chamber 42 through the inlet 40. The trap gate 44 of the trap 20 allows water to flow through it. In this way, the water that is pumped through the inlet 40 is pushed out of the trap gate 44 and into the first native water environment 16. There is also shown an optional bait feeder box 56 that is connected by a hose 55 to the main water pipe 28. The feeder box 56 may be activated or not at the option of the user. Also shown are net leads 50 that extend divergingly outwardly from the trap gate 44 in order to provide a physical guide for the fish to the trap chamber 42. A camera 43 may be mounted in the trap chamber 42 to monitor the interior of the trap chamber 42 and enable remote viewing of the harvest of fish inside the trap chamber 42.

Figure 2:
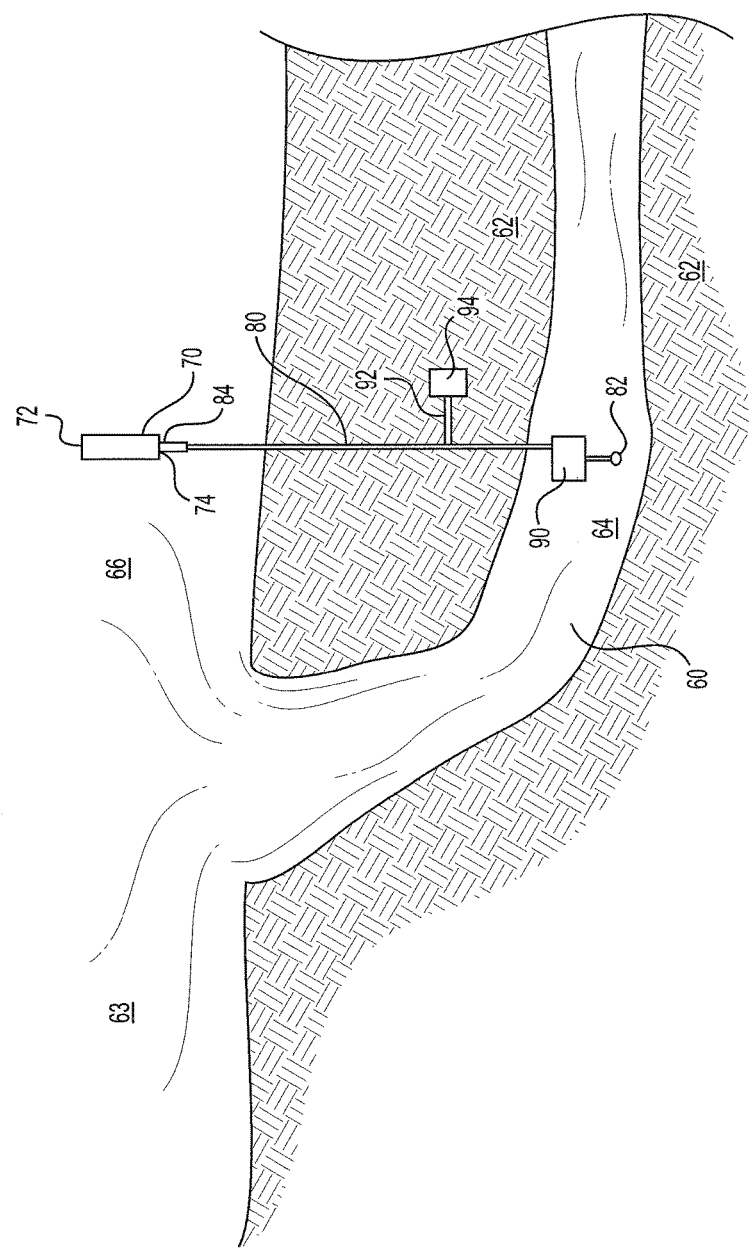
FIG. 2 is a schematic of a second example of a mechanical fish trap system described herein.

FIG. 2 is a schematic of a second fish trap system. In FIG. 2, a river 60 flows into an ocean 63. The river 60 flows between the banks 62. A fish trap 70 is positioned in the ocean 63 in a first native water environment 66. Water from a native water environment 64 is pumped through an intake end 82 of a water pipe 80 by a pump 90. The pump 90 pushes water through the water pipe 80 to the trap end 84 of the water pipe that is connected to the inlet 74 of the trap 70. Water passes through the trap 70 and out the trap gate 72 into the second native water environment 66. A bait feeder box 94 is connected by a hose 92 to the main water pipe 80. The bait box 94 may or may not be activated by a user.

Figure 3:
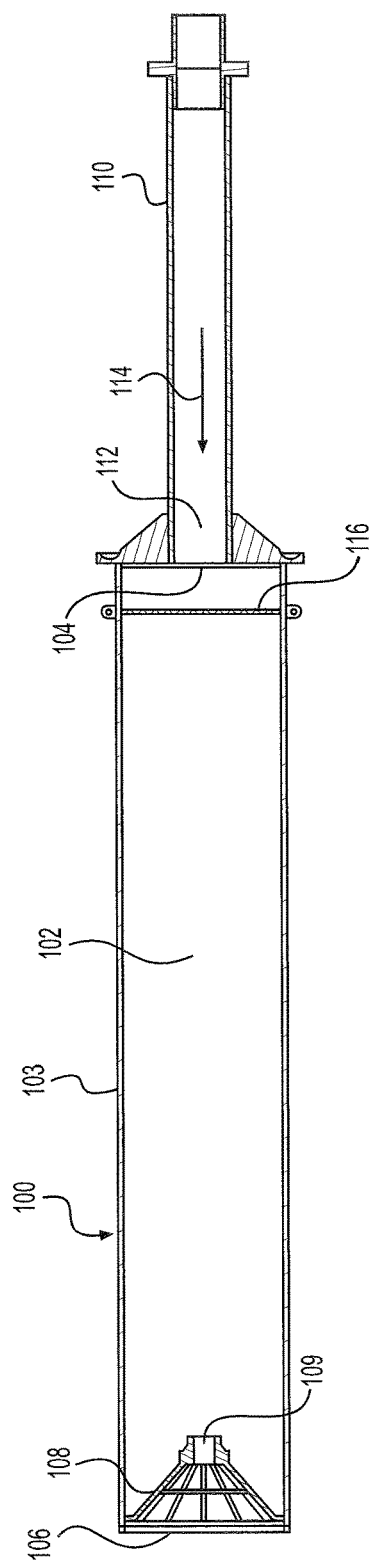
FIG. 3 is a side, cross-sectional view of a fish trap chamber.

FIG. 3 illustrates a trap 100 that includes a trap chamber 102 defined by the exterior trap walls 103. The trap 100 includes an inlet 104 on one end thereof and an outlet 106 on the opposite end that is covered with the trap gate 108. The trap gate 108 includes a central inlet 109 that allows fish entry into the trap chamber 102. The inlet 104 has the trap end 112 of a water pipe 110 connected to it. In this way, water flow 114 pushes water into and through the trap chamber 102. A screen 116 is positioned inside and across the cross-sectional area of the trap chamber 102. The screen 116 blocks fish from swimming into the water pipe 110. Alternatively, not shown, a screen can be mounted inside the trap chamber 102 and across the inlet 104 only for the same purpose.

Figure 4:
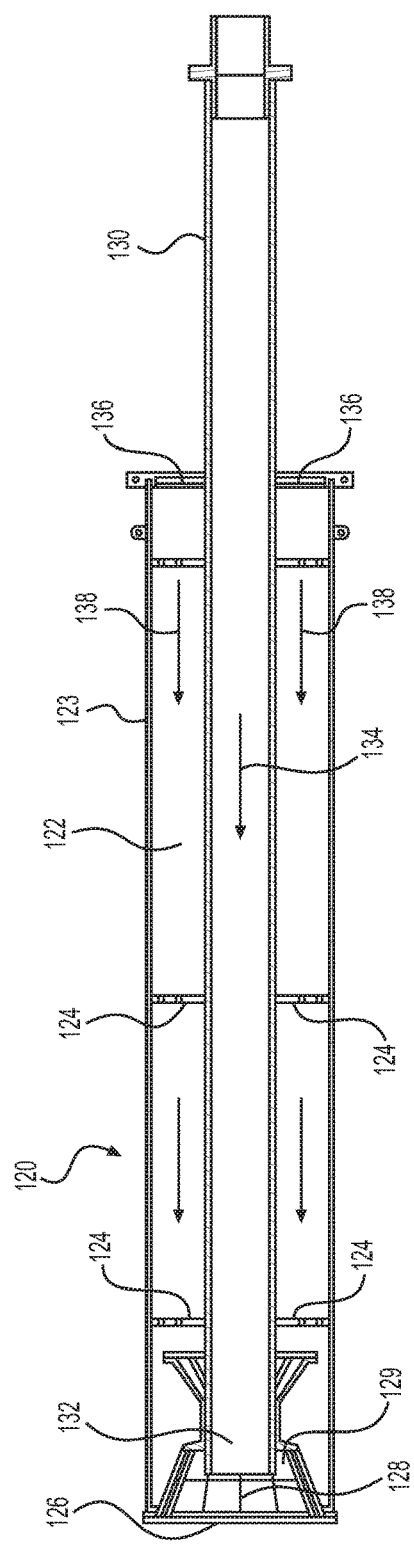
FIG. 4 is a side, cross-sectional view of another example of a fish trap chamber.

FIG. 4 is an alternative embodiment of a fish trap 120. The trap 120 includes a trap chamber 122 as defined by the solid trap walls 123. The water pipe 130 extends into the trap chamber 122 where it is secured by frame braces 124. The trap end 132 of the water pipe 130 extends through most of the trap chamber 122. The trap end 132 is attached to and secured by a trap gate 128 at the outlet end 126 of the trap 120. The trap gate 128 includes apertures 129 that allow fish to swim into the chamber 122. The trap 120 also includes screened openings 136. The water flow 134 through the water pipe 130 can be moved at relatively high pressure. The water flow 134, therefore, can create a lower pressure flow 138 through the openings 136.

Other embodiments of the present invention will be apparent to those skilled in the art from consideration of the specification. It is intended that the specification and Figures be considered as exemplary only, with a true scope and spirit of the invention being indicated by the following claims.

That which is claimed is:

1. A mechanical fish trap system, comprising:
a trap chamber having an inlet and an outlet, wherein the outlet is downstream of the inlet;
a trap gate mounted in the outlet, the trap gate having a shape that gradually reduces in diameter from a first end at the outlet toward a second end directed toward the inlet;
a water pipe connected to the trap chamber and having an intake end and a trap end, wherein the trap end is downstream of the intake end;
a water pump mounted in line with the water pipe, upstream from the trap end, to pump water from the intake end to the trap end and into and through the trap chamber; and
a screen mounted inside of the trap chamber between the inlet and the trap gate, wherein the screen allows water flow therethrough and into an inside of the trap chamber but to block a fish from passing therethrough;
wherein the trap gate allows water to flow therethrough, out of the trap chamber into a first native water environment, and also allows the fish to swim into the trap chamber to be retained therein; and
further wherein the water pipe intake end is placed in a second native water environment, and the water in the second native water environment is imbalanced with the water in the first native water environment, establishing a water imbalance adapted to draw the fish instinctively thereto.

2. The mechanical fish trap system of claim 1, wherein the water imbalance between the first and second native water environments is selected from the group consisting of salinity, oxygen, nutrition, temperature, water current speed, and water current direction.

3. The mechanical fish trap system of claim 2, wherein the water imbalance between the first and second native water environments consists of salinity.

4. The mechanical fish trap system of claim 1, wherein the intake end of the water pipe is placed in the second native water environment with a higher salinity than the first native water environment.

5. The mechanical fish trap system of claim 1, wherein the intake end of the water pipe is placed in the second native water environment with a lower salinity than the first native water environment.

6. The mechanical fish trap system of claim 1, further comprising a first lead net attached at one end thereof to the trap chamber and proximate, but not covering, the trap gate, wherein the first lead net extends outwardly from the trap chamber to guide the fish to the trap chamber.

7. The mechanical fish trap system of claim 6, further comprising a second lead net attached at the one end thereof to the trap chamber and extending outwardly from the trap chamber to guide the fish to the trap chamber.

8. The mechanical fish trap system of claim 1, wherein the trap gate is a reversed funnel adapted to prevent the fish from escaping the trap chamber.

9. The mechanical fish trap system of claim 1, further comprising a camera mounted onto the trap chamber and monitoring the inside of the trap chamber to enable remote viewing of a harvest of the fish inside the trap chamber.

10. The mechanical fish trap system of claim 1, wherein the first native water environment is an ocean.

11. The mechanical fish trap system of claim 1, wherein: the water pipe extends into the trap chamber.

12. The mechanical fish trap system of claim 11, wherein the trap end of the water pipe extends through most of the trap chamber.

13. The mechanical fish trap system of claim 12, wherein the trap end is attached to and secured by the trap gate at the outlet of the trap chamber.

14. The mechanical fish trap system of claim 13, wherein the trap gate defines apertures allowing access by the fish into the trap chamber.

15. The mechanical fish trap system of claim 11, wherein a first water flow through the water pipe is at a pressure higher than a second water flow through openings in the screen.

* * * * *